US011927901B2

(12) United States Patent
Doi

(10) Patent No.: US 11,927,901 B2
(45) Date of Patent: Mar. 12, 2024

(54) IMAGE FORMING APPARATUS

(71) Applicant: TOSHIBA TEC KABUSHIKI KAISHA, Tokyo (JP)

(72) Inventor: Yohei Doi, Mishima Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/837,758

(22) Filed: Jun. 10, 2022

(65) Prior Publication Data

US 2022/0299916 A1 Sep. 22, 2022

Related U.S. Application Data

(63) Continuation of application No. 17/233,749, filed on Apr. 19, 2021, now Pat. No. 11,385,579.

(30) Foreign Application Priority Data

Aug. 3, 2020 (JP) ................................ 2020-131496

(51) Int. Cl.
*G03G 15/20* (2006.01)
*G03G 15/00* (2006.01)

(52) U.S. Cl.
CPC ..... *G03G 15/2039* (2013.01); *G03G 15/5004* (2013.01); *G03G 15/5037* (2013.01)

(58) Field of Classification Search
CPC .. G03G 15/2039; G03G 15/205; G03G 15/50; G03G 15/5004; G03G 15/55; G03G 15/80
See application file for complete search history.

(56) References Cited

U.S. PATENT DOCUMENTS

2004/0232138 A1* 11/2004 Kwon .................. H05B 1/0241 219/492
2006/0078344 A1* 4/2006 Kawazu ............. G03G 15/2039 399/88
2015/0177656 A1 6/2015 Yoshimura
2017/0090396 A1 3/2017 Kosaka
2018/0120742 A1* 5/2018 Masuda ............. G03G 15/2039
2019/0087138 A1 3/2019 Suzuki et al.
2020/0096920 A1 3/2020 Ishikawa
2020/0310326 A1 10/2020 Kakutani
2021/0011410 A1 1/2021 Oi

FOREIGN PATENT DOCUMENTS

JP H0535012 A 2/1993
JP H08-221139 A 8/1996
JP H1164997 A 3/1999
JP 2005-234093 A 9/2005
JP 2007316168 A * 12/2007

OTHER PUBLICATIONS

Machine Translation of JP 2007-316168. (Year: 2007).*
Notice of Allowance in U.S. Appl. No. 17/233,749 dated Mar. 11, 2022.
U.S. Office Action in U.S. Appl. No. 17/233,749 dated Dec. 8, 2021.

* cited by examiner

*Primary Examiner* — Carla J Therrien
(74) *Attorney, Agent, or Firm* — FOLEY & LARDNER LLP

(57) ABSTRACT

According to at least one embodiment, an image forming apparatus includes a heater and a controller. The heater is configured to generate heat. The controller is configured to control AC power to the heater so that a part of the AC power which exceeds a threshold voltage is not applied to the heater.

20 Claims, 5 Drawing Sheets

IMAGE FORMING APPARATUS

CROSS-REFERENCE TO RELATED APPLICATIONS

This application is based on and claims the benefit of priority from U.S. patent application Ser. No. 17/233,749, filed on Apr. 19, 2021, which is based on and claims the benefit of priority from Japanese Patent Application No. 2020-131496, filed on Aug. 3, 2020, the entire contents of each of which are incorporated herein by reference.

FIELD

Embodiments described herein relate generally to an image forming apparatus.

BACKGROUND

A heater of a fixing device in an image forming apparatus may be damaged if a high voltage higher than the product rating is received by the fixing device. Therefore, in a related art, when a high voltage higher than the product rating is input, the heating unit of the fixing device is protected by making the machine unusable.

However, if the machine becomes unusable, the printing operation cannot be continued, which may reduce the printing efficiency.

DETAILED DESCRIPTION

The present disclosure describes at least one embodiment of an image forming apparatus that can be capable of suppressing a decrease in printing efficiency while protecting a heating unit of a fixing device at the time of high voltage input.

In general, according to at least one embodiment, the image forming apparatus includes a voltage measuring unit (e.g., a voltage measuring device), a fixing device, and a control unit (e.g., a controller). The voltage measuring unit measures the input voltage. The fixing device includes a heating unit (e.g., a heater) that heats the sheet. When the measured voltage becomes equal to or higher than a threshold value, the control unit determines a heating timing of the heating unit based on the voltage and controls the heating unit to be heated at the determined heating timing.

Hereinafter, the image forming apparatus of at least one embodiment will be described with reference to the drawings.

Figure 1:
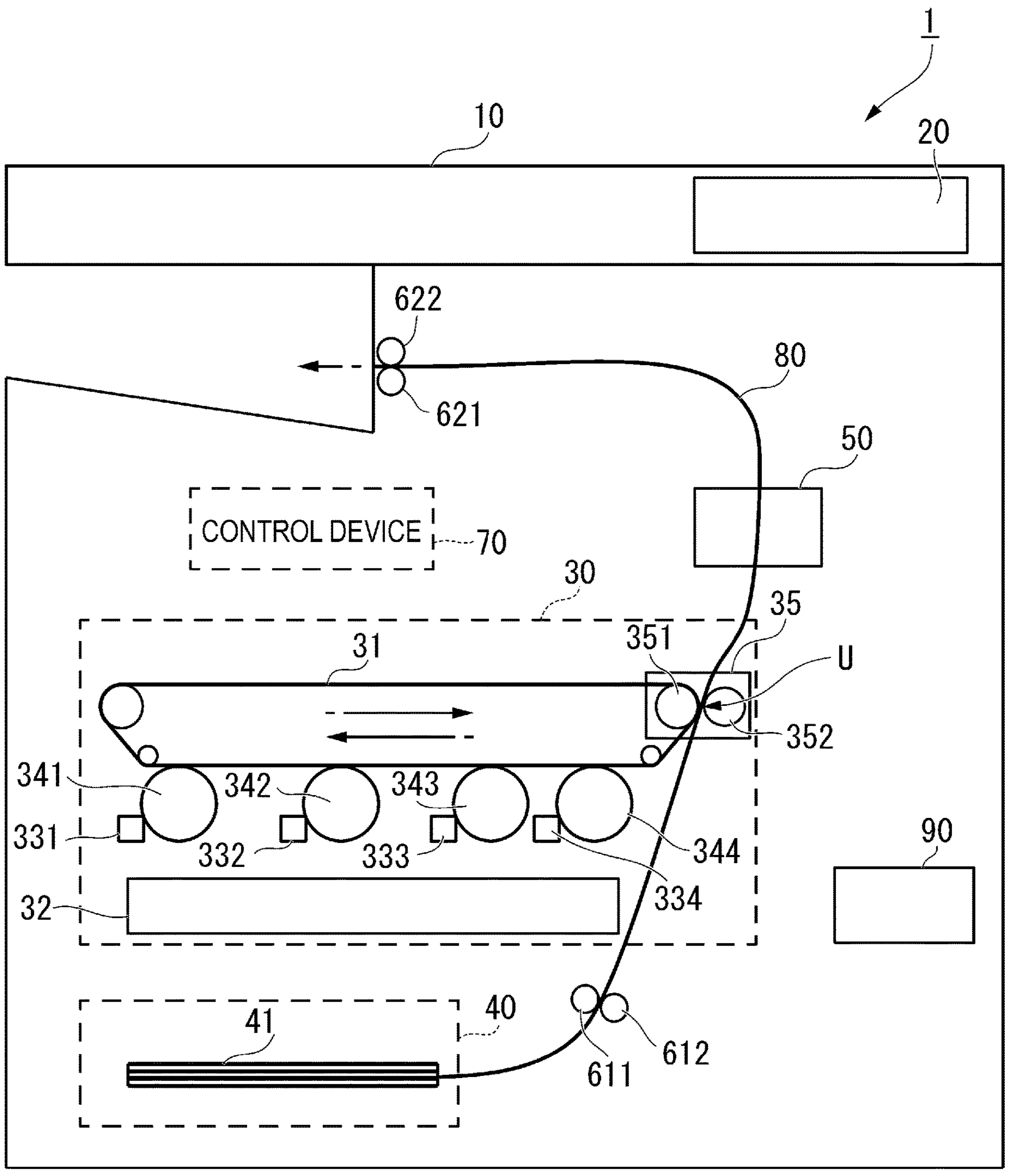
FIG. 1 is a diagram showing an overall configuration example of an image forming apparatus of at least one embodiment.

FIG. 1 is a diagram showing an overall configuration example of an image forming apparatus 1 of at least one embodiment. The image forming apparatus 1 of at least one embodiment is a multifunction peripheral (MFP). The image forming apparatus 1 executes printing by an image forming process and an image fixing process. The image forming process is a process of forming an image on a sheet. The image fixing process is a process for fixing the image formed on a sheet. The sheet is, for example, paper on which characters, images, and the like are formed. The sheet may be any material as long as the image forming apparatus 1 can form an image thereon.

The image forming apparatus 1 includes an image reading unit 10 (e.g., an image reader), a control panel 20, an image forming unit 30 (e.g., an image forming device), a sheet storage unit 40 (e.g., a sheet storage device), a fixing device 50, conveyance rollers 611 and 612, sheet discharge rollers 621 and 622, a control device 70, and a control board 90.

The image reading unit 10 reads the image on the document based on brightness and darkness of light. For example, the image reading unit 10 reads an image printed on a sheet set on a document reading table. The image reading unit 10 records the read image information. The recorded image information may be transmitted to another information processing device via a network. The recorded image information may be image-formed on a sheet by the image forming unit 30 as print data.

The control panel 20 includes a display unit (e.g., a display) and an operation unit (e.g., an operation device). The display unit is a display device such as a liquid crystal display and an organic electro luminescence (EL) display. The display unit displays various information regarding the image forming apparatus 1 according to the control of the control device 70. The operation unit includes a plurality of buttons and the like. The operation unit receives the operations of the user. For example, the operation unit receives a printing execution instruction. The operation unit outputs a signal corresponding to the operation performed by the user to the control device 70. The display unit and the operation unit may be configured as an integrated touch panel.

The image forming unit 30 executes the image forming process. Specifically, the image forming unit 30 forms an image on a sheet based on the image information generated by the image reading unit 10 or the image information received via a communication path. For example, the image forming unit 30 forms a toner image on a sheet with toner.

The image forming unit 30 includes a transfer belt 31, an exposure unit 32 (e.g., an exposure device), a plurality of developing devices 33 (developing devices 331, 332, 333, and 334), a plurality of photoconductor drums 34 (photoconductor drums 341, 342, 343, and 344), and a transfer unit 35 (e.g., a transfer device).

The transfer belt 31 is an endless intermediate transfer body. The transfer belt 31 rotates in the direction indicated by the arrow (counterclockwise) due to the rotation of the roller.

The exposure unit 32 is provided at a position facing the photoconductor drum 34 between the developing device 33 and the charging device (not shown). The exposure unit 32 irradiates the surfaces (e.g., photoconductor layer) of each of the photoconductor drums 341, 342, 343, and 344 with a laser beam based on image information. The direction in which the laser beam scans the photoconductor drum is the main scanning direction, and the direction orthogonal to the main scanning direction is the sub-scanning direction. For example, in at least one embodiment, the main scanning direction coincides with the axial direction of the photoconductor drum, and the sub-scanning direction coincides with the rotation direction of the transfer belt.

By the irradiation of the laser beam, the electric charge on the surface (e.g., photoconductor layer) of each of the photoconductor drums 341, 342, 343, and 344 disappears. As a result, an electrostatic pattern is formed on the surfaces of the photoconductor drums 341, 342, 343, and 344 at the positions irradiated with the laser beam. That is, an electrostatic latent image is formed on the surfaces of the photoconductor drums 341, 342, 343, and 344 by the irradiation of the laser beam by the exposure unit 32. The exposure unit 32 may use light emitting diode (LED) light instead of the laser light.

The developing devices 331, 332, 333, and 334 supply toner to the photoconductor drums 341, 342, 343, and 344. For example, the developing device 331 develops an electrostatic latent image on the surface of the photoconductor drum 341 with yellow (Y). Further, the developing device 332 develops an electrostatic latent image on the surface of the photoconductor drum 342 with magenta (M). Further, the developing device 333 develops an electrostatic latent image on the surface of the photoconductor drum 343 with cyan (C). Further, the developing device 334 develops an electrostatic latent image on the surface of the photoconductor drum 344 with black (K) toner.

The developing devices 331, 332, 333, and 334 form a toner image as a visible image on the photoconductor drums 341, 342, 343, and 344. The toner images formed on the photoconductor drums 341, 342, 343, and 344 are transferred (primary transfer) onto the transfer belt 31 by a plurality of primary transfer rollers (not shown). The plurality of primary transfer rollers are provided at positions facing each of the photoconductor drums 341, 342, 343, and 344 with the transfer belt 31 interposed therebetween.

The transfer unit 35 includes a support roller 351 and a secondary transfer roller 352. The transfer unit 35 transfers the toner image on the transfer belt 31 to a sheet 41 at a secondary transfer position U. The secondary transfer position U is a position where the support roller 351 and the secondary transfer roller 352 face each other with the transfer belt 31 interposed therebetween. The transfer unit 35 applies a transfer bias controlled by a transfer current to the transfer belt 31. The transfer unit 35 transfers the toner image on the transfer belt 31 to the sheet 41 by the transfer bias. The transfer current is controlled by the control device 70.

The sheet accommodating unit 40 includes a single or a plurality of sheet feed cassettes. The sheet feed cassette stores a predetermined size and a predetermined type of sheets 41. The sheet feed cassette is provided with a pickup roller. The pickup roller picks up the sheets 41 one by one from the sheet feed cassette. The pickup roller supplies the picked-up sheet 41 to a conveyance unit 80 (e.g., a conveyance device).

The fixing device 50 executes the image fixing process. Specifically, the fixing device 50 fixes an image (for example, a toner image) formed on the sheet 41 by heating and pressurizing the sheet 41. The fixing device 50 includes a heating unit (e.g., a heater) that heats the sheet 41. The heating unit is, for example, of a halogen lamp type, an induction heating (IH) type, or a planar heater type. The planar heater is a heater provided with a heat-generating resistor on the surface thereof.

The conveyance rollers 611 and 612 supply the sheet 41 fed from the sheet feed cassette to the image forming unit 30. The conveyance rollers 611 and 612 are installed at opposite positions.

The sheet discharge rollers 621 and 622 discharges the sheet 41 on which the image is formed by the fixing device 50 to the discharge unit. The sheet discharge rollers 621 and 622 are installed at opposite positions.

The control device 70 controls each functional unit of the image forming apparatus 1.

The conveyance unit 80 conveys the sheet 41. The conveyance unit 80 includes a conveyance path and a plurality of rollers (not shown). The conveyance path is a path through which the sheet 41 is conveyed. The roller conveys the sheet 41 by rotating according to the control of the control device 70.

The control board 90 controls the heating of the heating unit of the fixing device 50 according to the control of the control device 70. Controlling the heating of the heating unit means controlling to heat the heating unit (e.g., activating the heater) or controlling to stop the heating of the heating unit (e.g., deactivating the heater).

Figure 2:
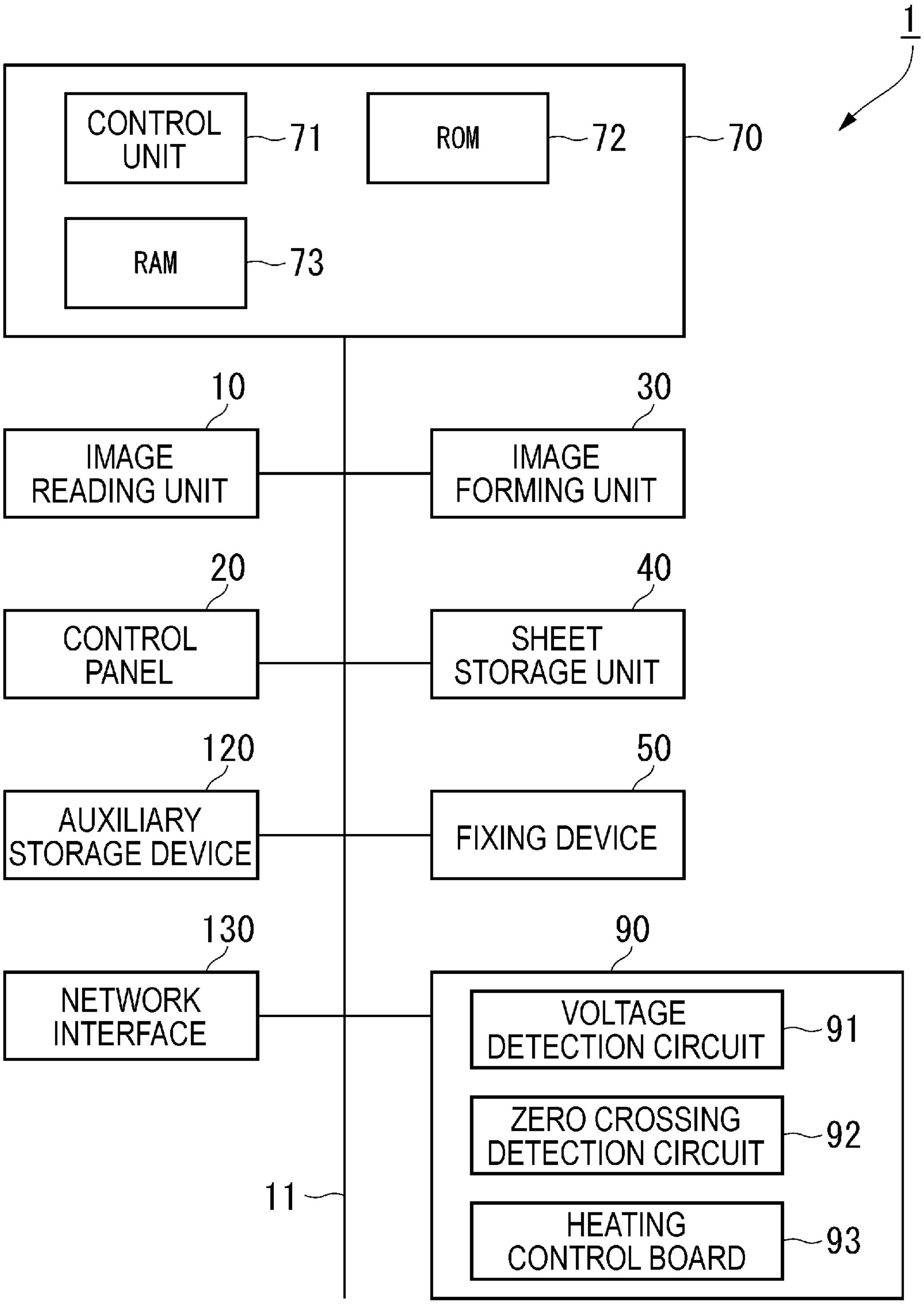
FIG. 2 is a block diagram showing a hardware configuration.

FIG. 2 is a block diagram showing a hardware configuration of the image forming apparatus 1 of at least one embodiment. FIG. 2 shows only the characteristic hardware configuration of the image forming apparatus 1 in at least one embodiment.

The image forming apparatus 1 includes the image reading unit 10, the control panel 20, the image forming unit 30, the sheet storage unit 40, the fixing device 50, the control device 70, the control board 90, an auxiliary storage device 120, and a network interface 130. Each functional unit is connected to be capable of data communication via a system bus 11.

Since the specific configurations of the image reading unit 10, the control panel 20, the image forming unit 30, the sheet storage unit 40, and the fixing device 50 were described, the description thereof will be omitted. Hereinafter, the control device 70, the control board 90, the auxiliary storage device 120, and the network interface 130 will be described.

The control board 90 includes a voltage detection circuit 91, a zero crossing detection circuit 92, and a heating control board 93.

The voltage detection circuit 91 measures the voltage input to the image forming apparatus 1. The voltage detection circuit 91 may measure the voltage for each job or may measure the voltage at a predetermined timing. The predetermined timing may be, for example, the timing at which the power of the image forming apparatus 1 is turned on, or the timing at which the predetermined time is reached. The voltage detection circuit 91 outputs the measured voltage value to the control device 70. The voltage detection circuit 91 is an aspect of the voltage measuring unit.

The zero crossing detection circuit 92 detects the zero crossing point of the AC voltage input from the power supply. Zero crossing point detection is to detect the timing when the voltage of the AC power supply passes through zero volts. The zero crossing detection circuit 92 outputs a zero crossing signal indicating that the zero crossing point is detected to the control device 70 each time the zero crossing point is detected.

The heating control board 93 is a switching element that controls the power supply to the fixing device 50. The heating control board 93 is, for example, a triac. The heating control board 93 can switch between an ON state and an OFF state based on a control signal transmitted from the control device 70. When the heating control board 93 is in the ON state, the heating control board 93 and the fixing device 50 are electrically connected, and thus, power is supplied to the fixing device 50. On the other hand, when the heating control board 93 is in the OFF state, the heating control board 93 and the fixing device 50 are not electrically connected, and thus, power is not supplied to the fixing device 50. The heating control board 93 is a non-zero crossing type triac. The non-zero crossing type can be turned on when a control signal is input, even at a point not near the alternating current zero volts.

The control device 70 includes a control unit 71 (e.g., a controller), a Read Only Memory (ROM) 72, and a Random Access Memory (RAM) 73. The control unit 71 is, for example, a processor such as a Central Processing Unit (CPU) or a Graphics Processing Unit (GPU). The control unit 71 controls the operation of each functional unit of the image forming apparatus 1. The control unit 71 executes various processes by loading the program stored in the ROM 72 into the RAM 73 and executing the program. The Application Specific Integrated Circuit (ASIC) may have an appropriate function realized by the control unit 71. The ASIC is a dedicated circuit for realizing a specific function.

The control unit 71 controls the heating unit to be heated (e.g., activates the heater) at the heating timing of the heating unit based on the voltage when the voltage measured by the voltage detection circuit 91 exceeds a threshold value. Here, the threshold value is a value higher than the rated voltage defined by the image forming apparatus 1. The heating timing of the heating unit based on the voltage is the timing at which the time obtained from the voltage measured by the voltage detection circuit 91 elapsed. The control unit 71 controls the heating unit to be heated when the heating timing is reached, with reference to the zero crossing point detected by the zero crossing detection circuit 92. The control unit 71 controls the heating unit to be heated where the heating timing is after the peak of the AC voltage input from the power source.

When the voltage measured by the voltage detection circuit 91 exceeds the threshold value, the control unit 71 executes the sheet printing process by a protection control. The protection control is a printing control that reduces the efficiency of the printing operation. There is also a limit to the power that can be used when operating with the protection control. Therefore, the control unit 71 performs one or more controls of the following (1) to (4) as the printing control that reduces the efficiency of the printing operation. Which control is to be performed may be set by the user at the time of printing or may be set in advance.

(1) Control for making the sheet conveyance speed slower than the normal conveyance speed
(2) Control for reducing the density during printing
(3) Control that enables printing of a specific sheet type
(4) Control that enables single-color printing The normal time is a case where no abnormality occurs in the image forming apparatus 1. Information on the sheet conveyance speed at the normal time and the sheet conveyance speed at the time of making it slower than the normal time is set in advance. The control for reducing the density at the time of printing is a control for printing at a density lower than the density set at the time of printing. The control that enables printing of a specific sheet type is a control that enables printing of only some types of sheets. For example, the control enables printing on plain paper and disables printing on thick paper. The control that enables single-color printing is a control that enables monochrome printing and disables color printing.

When the control unit 71 executes the sheet printing process by the protection control, the control panel 20 displays that the sheet printing process by the protection control is being executed.

The ROM 72 stores a program for operating the control unit 71. The RAM 73 is a memory for temporarily storing data used by each functional unit included in the image forming apparatus 1. The RAM 73 may store the digital data generated by the image reading unit 10. The RAM 73 may temporarily store jobs and job logs.

The auxiliary storage device 120 is, for example, a hard disk or a solid state drive (SSD) and stores various data. The various data are, for example, digital data, jobs, job logs, and the like.

The network interface 130 transmits and receives data to and from other devices. Here, the other device is an information processing device such as a personal computer. The network interface 130 operates as an input interface and receives print data or instructions transmitted from other devices. Instructions transmitted from other devices include printing execution instructions and the like. In addition, the network interface 130 operates as an output interface and transmits data to other devices.

Figure 3:
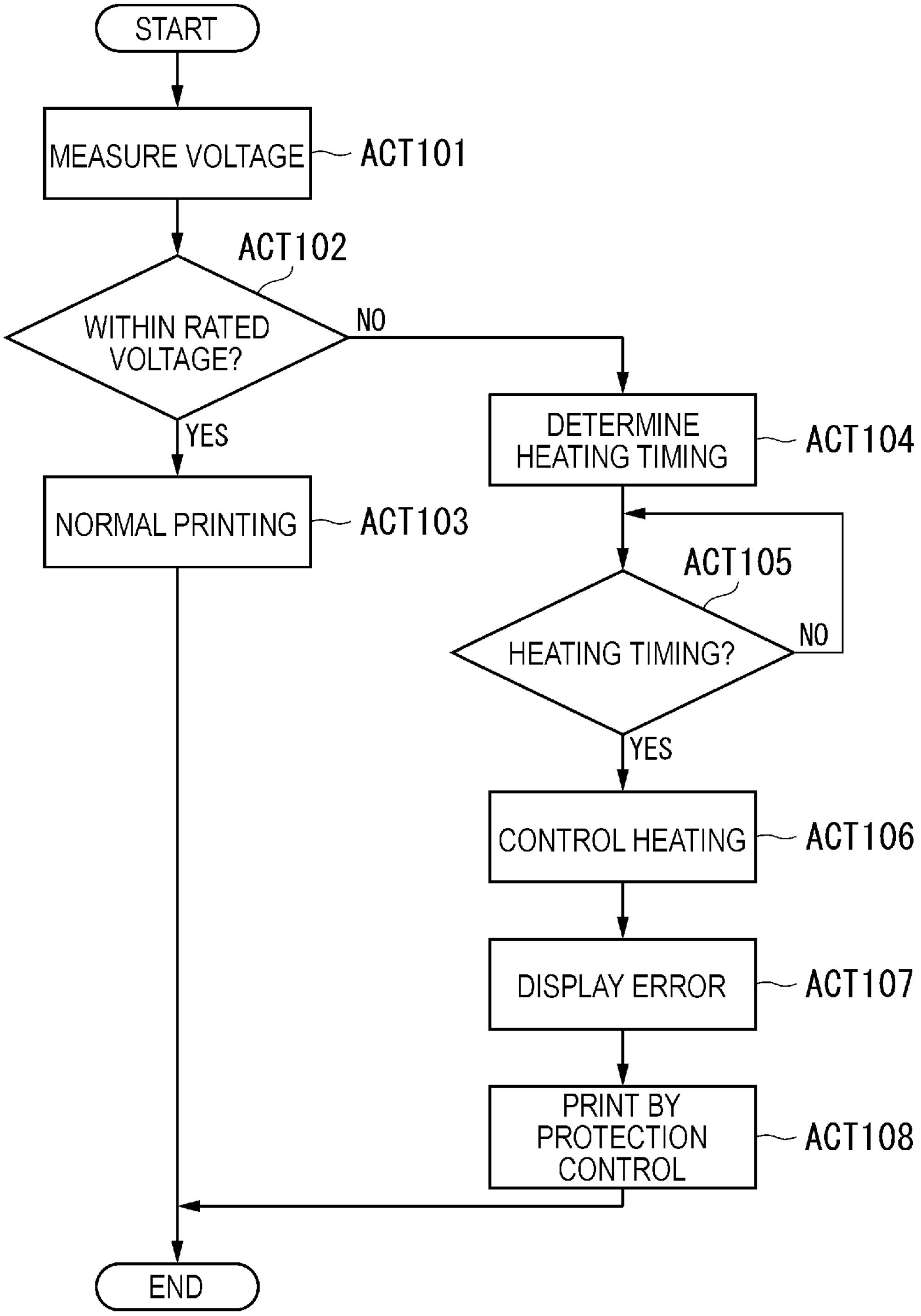
FIG. 3 is a flowchart showing a flow of printing control processing performed by the image forming apparatus according to at least one embodiment.

FIG. 3 is a flowchart showing the method of printing control processing performed by the image forming apparatus 1 in at least one embodiment. The processing shown in FIG. 3 is executed when a printing execution instruction is given to the image forming apparatus 1.

The voltage detection circuit 91 measures the input voltage (ACT 101). The voltage detection circuit 91 outputs the measured voltage value information to the control device 70. The control unit 71 of the control device 70 determines whether or not the voltage value is within the rated voltage based on the voltage value information (ACT 102). If the voltage value is within the rated voltage (ACT 102: YES), an abnormally high voltage is not input to the image forming apparatus 1. Therefore, the image forming apparatus 1 performs normal printing (ACT 103). Specifically, the control unit 71 controls the image forming unit 30 and the fixing device 50 to execute printing for which an execution instruction is given.

If the voltage value is not within the rated voltage (ACT 102: NO), it means that a voltage equal to or higher than the threshold value was input to the image forming apparatus 1. Therefore, the control unit 71 determines a heating timing based on the input voltage value (e.g., a voltage equal to or higher than the threshold value) (ACT 104). A method for determining the heating timing will be described. First, the control unit 71 calculates the maximum value based on the input voltage value. For example, when the rating of the AC voltage is 100 (V), the maximum value can be obtained based on the following Equation (1).

$$\text{Maximum value}=100\times\sqrt{2}=141.1\ (\text{V}) \qquad \text{Equation (1)}$$

The instantaneous value of the sine wave of the AC voltage can be obtained based on the following Equation (2).

$$\text{Instantaneous value}=\text{maximum value}\times\sin\omega t \qquad \text{Equation (2)}$$

($\omega=2\pi f$, f=50 Hz)

By transforming Equation (2), Equation (3) can be obtained.

$$sn\omega t=\text{Instantaneous value/Maximum value}=(\text{Abnormal voltage}\times\sqrt{2})/141.1 \qquad \text{Equation (3)}$$

By transforming Equation (3), Equation (4) is obtained.

$$t=\sin^{-1}\times 2\pi f\times(\text{Abnormal voltage}\times\sqrt{2})/141.1 \qquad \text{Equation (4)}$$

The abnormal voltage shown in Equations (3) and (4) is a value of a voltage (V) equal to or higher than the threshold value input to the image forming apparatus 1. The control unit 71 determines the heating timing to be the timing at which the time t elapses, which is determined by Equation (4), with reference to the zero crossing point. After that, the control unit 71 determines whether or not the heating timing was reached (ACT 105). A zero crossing signal output is input to the control unit 71 every time the zero crossing detection circuit 92 detects a zero crossing point. Therefore, the control unit 71 determines whether or not the heating timing is reached based on the zero crossing signal input after determining the heating timing. Specifically, the control unit 71 determines that the heating timing was reached when the time t elapsed since the zero crossing signal was input, with reference to the input zero crossing signal. On the other hand, the control unit 71 determines that the heating timing was not reached when the time t did not elapse since the zero crossing signal was input, with reference to the input zero crossing signal.

If the heating timing was not reached (ACT 105: NO), the control unit 71 waits until the heating timing is reached.

On the other hand, when the heating timing is reached (ACT 105: YES), the control unit 71 controls the heating of the fixing device 50 by outputting a control signal to the heating control board 93 (ACT 106). Specifically, when a control signal is input to the heating control board 93, the heating control board 93 and the fixing device 50 are electrically connected. As a result, power is supplied to the fixing device 50 to heat the heating unit (e.g., activate the heater).

The control unit 71 controls the control panel 20 and displays an error (ACT 107). For example, the control unit 71 causes the control panel 20 to display a notification indicating that protective printing due to a voltage abnormality is in progress. The control unit 71 executes a printing operation under protection control (ACT 108). Since the heating control board 93 has an avalanche breakdown, the control unit 71 outputs a control signal for turning off the heating control board 93 before zero crossing.

Figure 4:
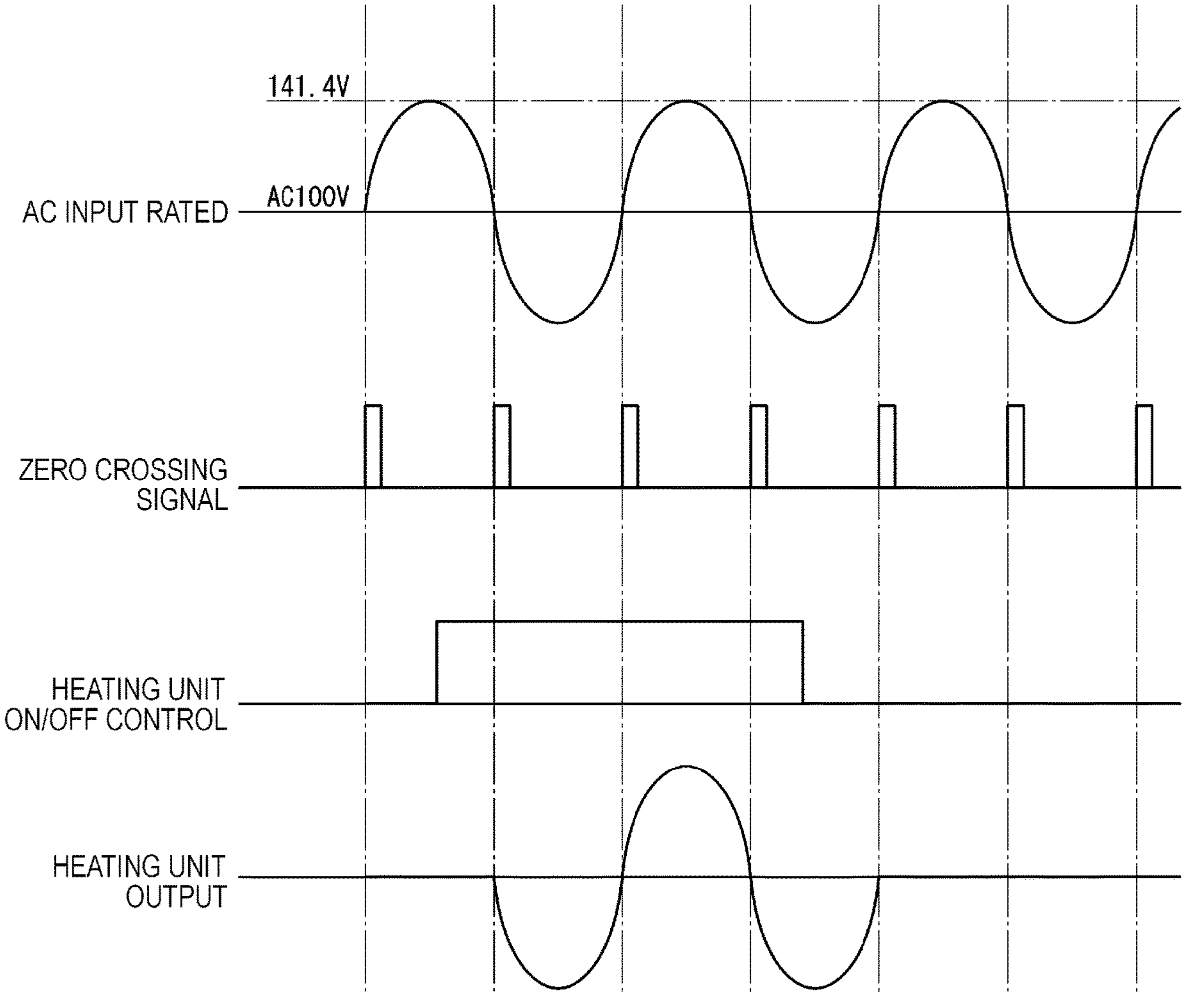
FIG. 4 is a diagram for illustrating the operation of the image forming apparatus when the input voltage is rated.
Figure 5:
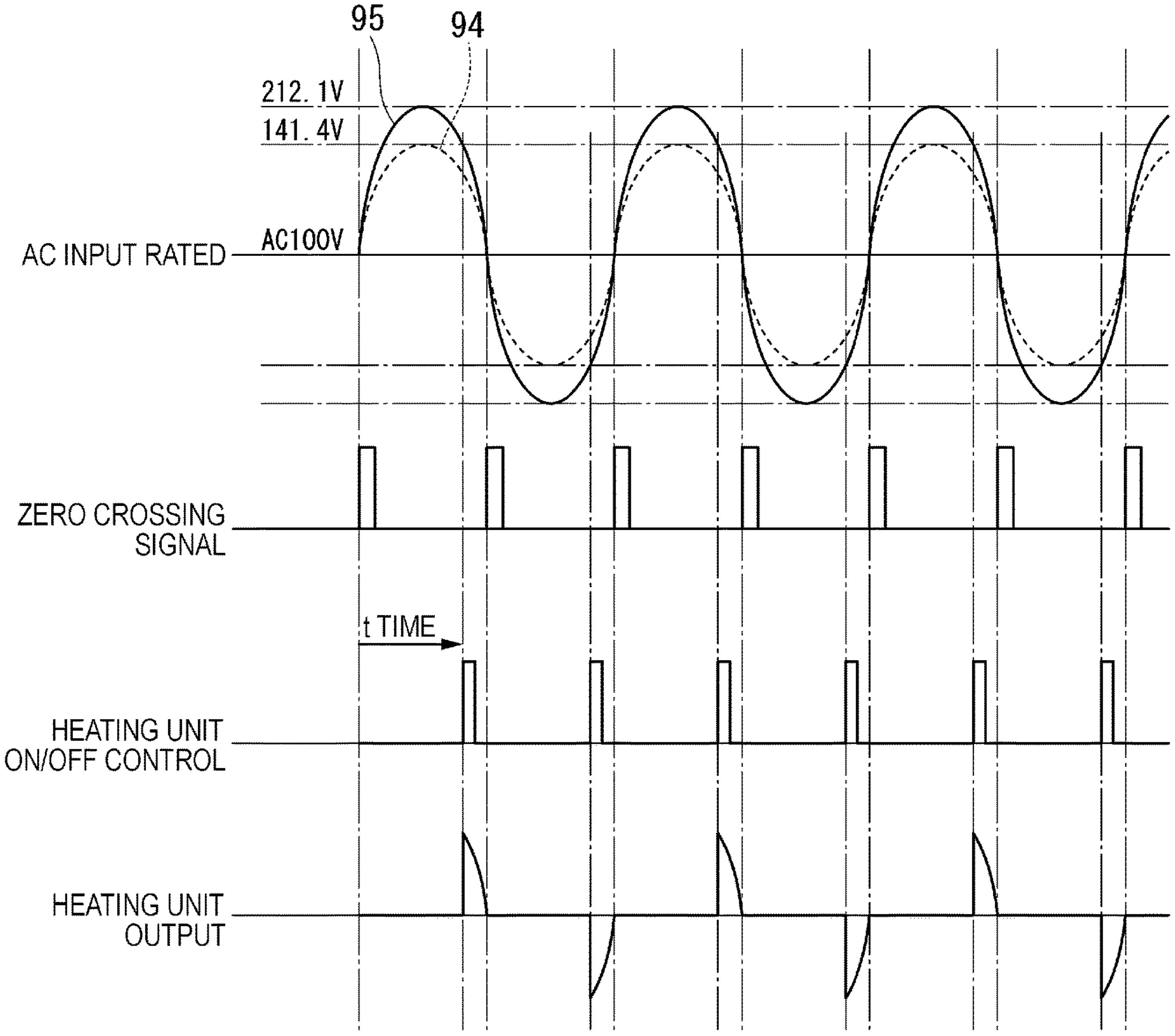
FIG. 5 is a diagram for illustrating the operation of the image forming apparatus when the input voltage is high.

FIG. 4 is a diagram for illustrating the operation of the image forming apparatus 1 when the input voltage is rated. FIG. 5 is a diagram for illustrating the operation of the image forming apparatus 1 when the input voltage is a high voltage (a voltage larger than the rated voltage).

As shown in FIG. 4, when the input voltage is rated (for example, 100 V), the printing process is executed without protection control. Therefore, the printing operation is continuously performed as shown in the heating unit ON and OFF control. On the other hand, as shown in FIG. 5, when the input voltage is high, the image forming apparatus 1 controls the heating unit to be heated (e.g., activates) at the timing when time t elapses with reference to the zero crossing signal. Then, the image forming apparatus 1 stops the heating of the heating unit before the next zero crossing. As described above, when the input voltage is high, the image forming apparatus 1 periodically switches between the ON control and the OFF control of the heating unit to perform the printing operation. FIG. 5 shows the waveform 94 of the AC voltage at the time of rated voltage and the waveform 95 of the AC voltage at the time of high voltage.

According to the image forming apparatus 1 configured as described above, it is possible to suppress a decrease in printing efficiency while protecting the heating unit of the fixing device 50 at the time of high voltage input. Specifically, first, the image forming apparatus 1 determines the heating timing of the heating unit based on the voltage when the measured voltage becomes equal to or higher than the threshold value. The image forming apparatus 1 controls the heating unit to be heated at a determined heating timing. In this way, the image forming apparatus 1 determines the heating timing of the heating unit based on the input voltage. Then, the image forming apparatus 1 does not execute the printing process immediately even if the printing instruction is input, and does not print until the determined heating timing is reached. As a result, even when an abnormally high voltage whose input voltage exceeds the product rating is input, an abnormal voltage is not applied to the heating unit (for example, a heater) of the fixing device. Therefore, it is possible to prevent damage to the heating unit of the fixing device. Further, the image forming apparatus 1 prints when the determined heating timing is reached. Therefore, even if the input voltage is an abnormally high voltage, the heating unit of the fixing device can be heated, and thus, the printing operation can be executed although the full performance is not achieved. In this way, the image forming apparatus 1 can suppress a decrease in printing efficiency while protecting the heating unit of the fixing device 50 at the time of high voltage input.

The image forming apparatus 1 includes the zero crossing detection circuit 92 that detects a zero crossing point of an AC voltage. Then, the image forming apparatus 1 controls the heating unit to be heated when the heating timing is reached, with reference to the zero crossing point detected by the zero crossing detection circuit 92. In this way, the image forming apparatus 1 can control the heating unit to be heated at the timing when the same time elapses from the zero crossing point by using the zero crossing point as a reference. Therefore, printing can be performed based on substantially the same voltage. Therefore, printing unevenness can be reduced.

The image forming apparatus 1 controls the heating of the heating unit at the timing after the peak of the AC voltage input from the power source as the heating timing. For example, the image forming apparatus 1 controls the heating of the heating unit at the timing when the absolute value of the voltage waveform becomes equal to or lower than the voltage rated by the product. By performing such control, it is possible to prevent damage to the heating unit even when a high voltage is input.

When the voltage measured by the voltage detection circuit 91 exceeds the threshold value, the image forming apparatus 1 executes the sheet printing process by performing printing control that reduces the efficiency of the printing operation. As a result, although the performance is reduced, the printing operation can be continuously executed. Therefore, it becomes possible to improve convenience.

The image forming apparatus 1 performs one or more controls of the above (1) to (4) as a printing control that reduces the efficiency of the printing operation. As a result, although the performance is reduced, the printing operation can be continuously executed. Therefore, it becomes possible to improve convenience.

When the input voltage is abnormal, if a step-down circuit is provided in all stages to protect the heating unit, the cost will increase. On the other hand, in the image forming apparatus 1 of at least one embodiment, this control can be realized by combining the voltage detection circuit 91 and the zero crossing detection circuit 92 provided in the image forming apparatus 1. Therefore, an increase in product cost can be suppressed.

If the pattern width is widened in order to increase the pressure resistance of the heating unit, it will heat other than the nip part, which will not save energy. The cost becomes higher. On the other hand, since the image forming apparatus 1 is a control that operates when an abnormal voltage is input, the image forming apparatus 1 operates in a normal state when a voltage at the product rating is input, which does not affect the fixing control. Therefore, it is possible to take advantage of TPH.

Hereinafter, a modification of the image forming apparatus 1 will be described.

In the above description, the voltage detection circuit 91, the zero crossing detection circuit 92, and the heating control board 93 are configured to be provided in the control board 90. The voltage detection circuit 91, the zero crossing detection circuit 92, and the heating control board 93 may be individually provided in the image forming apparatus 1.

A part of the functions of the image forming apparatus 1 in at least one embodiment may be realized by a computer. In that case, the program for realizing this function is recorded on a computer-readable recording medium. Then, the program recorded on the recording medium on which the above-mentioned program was recorded may be read into a computer system and executed. The term "computer system" as used herein includes an operating system and hardware such as peripheral devices. Further, the "computer-readable recording medium" refers to a portable medium, a storage device, or the like. The portable medium is a flexible disk, a magneto-optical disk, a ROM, a CD-ROM, or the like. The storage device is a hard disk or the like built in a computer system. Further, the "computer-readable recording medium" is a medium that dynamically holds a program for a short period of time, such as a communication line when a program is transmitted via a communication line. The communication line is a network such as the Internet, a telephone line, or the like. Further, the "computer-readable recording medium" may be a volatile memory inside a computer system serving as a server or a client. The volatile memory holds a program for a certain period of time. Further, the above program may be for realizing a part of the above-mentioned functions. Further, the above program may further realize the above-mentioned functions in combination with a program already recorded in the computer system.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An image forming apparatus comprising:
- a heater configured to generate heat;
- a voltage detection circuit configured to measure a voltage of AC power input to the image forming apparatus; and
- a controller configured to:
  - determine a part of the measured voltage of AC power input that exceeds a threshold voltage; and
  - control AC power to the heater so that the part of the measured voltage of AC power which exceeds the threshold voltage is not applied to the heater.

2. The apparatus of claim 1, further comprising a zero crossing detection circuit which outputs a zero crossing signal indicating that a zero crossing point in voltage in the AC power is detected,
- wherein the controller controls the AC power so that the AC power is not applied to the heater, after the zero crossing signal is output, while the AC power exceeds the threshold voltage.

3. The apparatus of claim 1, further comprising a zero crossing detection circuit which outputs a zero crossing signal indicating that a zero crossing point in voltage in the AC power is detected,
- wherein the controller controls the AC power so that the AC power is not applied to the heater, after the zero crossing signal is output and a peak of the AC power, while the AC power exceeds the threshold voltage.

4. The apparatus of claim 1, further comprising a zero crossing detection circuit which outputs a zero crossing signal indicating that a zero crossing point in voltage in the AC power is detected,
- wherein the controller controls the AC power so that the AC power is not applied to the heater, after the zero crossing signal is output and a peak of the AC power, before the AC power becomes lower than the threshold voltage.

5. The apparatus of claim 1, further comprising a zero crossing detection circuit which outputs a zero crossing signal indicating that a zero crossing point in voltage in the AC power is detected,
- wherein the controller determines a timing at which the AC power becomes lower than the threshold voltage after the zero crossing signal is output and the AC power becomes higher than the threshold voltage, and
- the controller controls the AC power so that the AC power is not applied to the heater from when the zero crossing signal is output to the timing.

6. The apparatus of claim 1, further comprising a zero crossing detection circuit which outputs a zero crossing signal each time a zero crossing point in voltage in the AC power is detected.

7. The apparatus of claim 1, further comprising a zero crossing detection circuit which outputs a zero crossing signal each time a zero crossing point in voltage in the AC power is detected,
- wherein the controller controls the AC power so that the AC power is not applied to the heater, each time after the zero crossing signal is output and a peak of the AC power, while the AC power exceeds the threshold voltage.

8. The apparatus of claim 1, further comprising a zero crossing detection circuit which outputs a zero crossing signal each time a zero crossing point in voltage in the AC power is detected,
- wherein the controller controls the AC power so that the AC power is not applied to the heater, each time after the zero crossing signal is output and a peak of the AC power, before the AC power becomes lower than the threshold voltage.

9. The apparatus of claim 1, further comprising a zero crossing detection circuit which outputs a zero crossing signal each time a zero crossing point in voltage in the AC power is detected,
- wherein the controller determines a timing at which the AC power becomes lower than the threshold voltage after the zero crossing signal is output and the AC power becomes higher than the threshold voltage, and
- the controller controls the AC power so that the AC power is not applied to the heater each time from when the zero crossing signal is output to the timing.

10. The apparatus of claim 1, wherein the heater is a planar heater having a heat-generating resistor.

11. A method of heater control performed by an image forming apparatus, the method comprising:
- generating heat, via a heater;
- measuring, by a voltage detection circuit, a voltage of AC power input to the image forming apparatus;
- determining a part of the measured voltage of AC power input exceeds a threshold voltage; and controlling AC power to the heater so that the part of the measured voltage of AC power which exceeds the threshold voltage is not applied to the heater.

12. The method of claim 11, further comprising:

outputting a zero crossing signal indicating that a zero crossing point in voltage in the AC power is detected, wherein in the step of controlling the AC power to the heater, the AC power is not applied to the heater, after the zero crossing signal is output, while the AC power exceeds the threshold voltage.

13. The method of claim 11, further comprising:

outputting a zero crossing signal indicating that a zero crossing point in voltage in the AC power is detected, wherein in the step of controlling the AC power to the heater, the AC power is not applied to the heater, after the zero crossing signal is output and a peak of the AC power, while the AC power exceeds the threshold voltage.

14. The method of claim 11, further comprising:

outputting a zero crossing signal indicating that a zero crossing point in voltage in the AC power is detected, wherein in the step of controlling the AC power to the heater, the AC power is not applied to the heater, after the zero crossing signal is output and a peak of the AC power, before the AC power becomes lower than the threshold voltage.

15. The method of claim 11, further comprising:

outputting a zero crossing signal indicating that a zero crossing point in voltage in the AC power is detected;

determining a timing at which the AC power becomes lower than the threshold voltage after the zero crossing signal is output and the AC power becomes higher than the threshold voltage, wherein in the step of controlling the AC power to the heater, the AC power is not applied to the heater from when the zero crossing signal is output to the timing.

16. The method of claim 11, further comprising:

outputting a zero crossing signal each time a zero crossing point in voltage in the AC power is detected.

17. The method of claim 11, further comprising:

outputting a zero crossing signal each time a zero crossing point in voltage in the AC power is detected, wherein in the step of controlling the AC power to the heater, the AC power is not applied to the heater, each time after the zero crossing signal is output and a peak of the AC power, while the AC power exceeds the threshold voltage.

18. The method of claim 11, further comprising:

outputting a zero crossing signal each time a zero crossing point in voltage in the AC power is detected, wherein in the step of controlling the AC power to the heater, the AC power is not applied to the heater, each time after the zero crossing signal is output and a peak of the AC power, before the AC power becomes lower than the threshold voltage.

19. The method of claim 11, further comprising:

outputting a zero crossing signal each time a zero crossing point in voltage in the AC power is detected; and determining a timing at which the AC power becomes lower than the threshold voltage after the zero crossing signal is output and the AC power becomes higher than the threshold voltage, wherein a zero crossing signal is output each time a zero crossing point in voltage in the AC power is detected, and wherein in the step of controlling the AC power to the heater, the AC power is not applied to the heater each time from when the zero crossing signal is output to the timing.

20. The method of claim 11, wherein the heater is a planar heater having a heat-generating resistor.

* * * * *